United States Patent
Ryan et al.

(10) Patent No.: US 6,923,456 B2
(45) Date of Patent: Aug. 2, 2005

(54) SHOPPING CART HAVING CASTER LIFT

(75) Inventors: Mark T. Ryan, Checotah, OK (US); Richard Wilkinson, Broken Arrow, OK (US)

(73) Assignee: Unarco Industries, Inc., Wagoner, OK (US)

( * ) Notice: Subject to any disclaimer, the term of this patent is extended or adjusted under 35 U.S.C. 154(b) by 65 days.

(21) Appl. No.: 10/656,711

(22) Filed: Sep. 5, 2003

(65) Prior Publication Data

US 2004/0084863 A1 May 6, 2004

Related U.S. Application Data

(63) Continuation-in-part of application No. 10/235,736, filed on Sep. 5, 2002, now abandoned.

(51) Int. Cl.$^7$ .............................................. B62D 39/00
(52) U.S. Cl. .............................. 280/33.991; 280/33.997
(58) Field of Search ....................... 280/33.991, 33.992, 280/33.993, 33.995, 33.996, 33.997, 47.35, 47.34

(56) References Cited

U.S. PATENT DOCUMENTS

| | | | | |
|---|---|---|---|---|
| 3,015,494 A | * | 1/1962 | Fosbrook, Sr. | 280/33.991 |
| 3,361,438 A | * | 1/1968 | Davis | 280/33.991 |
| 4,519,622 A | | 5/1985 | Levy-Joseph | |
| 4,616,839 A | * | 10/1986 | Trubiano | 280/33.991 |
| 4,647,055 A | * | 3/1987 | Weill | 280/33.992 |
| 5,409,245 A | | 4/1995 | Kern et al. | |
| 5,791,666 A | * | 8/1998 | Mainard | 280/33.991 |
| 5,865,448 A | * | 2/1999 | Kern et al. | 280/33.992 |
| 6,126,181 A | * | 10/2000 | Ondrasik | 280/33.991 |
| 6,203,029 B1 | | 3/2001 | Ondrasik | |
| 6,315,306 B1 | * | 11/2001 | Fernie et al. | 280/33.991 |
| 6,749,204 B2 | * | 6/2004 | Werner | 280/33.992 |
| 2003/0042694 A1 | * | 3/2003 | Werner | 280/33.991 |
| 2004/0046341 A1 | * | 3/2004 | Wilkinson | 280/33.991 |
| 2004/0201187 A1 | * | 10/2004 | Ondrasik | 280/33.991 |

FOREIGN PATENT DOCUMENTS

| | | | | |
|---|---|---|---|---|
| FR | 2581933 A1 | * | 11/1986 | B60B/33/00 |
| GB | 2176444 | * | 12/1986 | B62B/3/00 |

* cited by examiner

Primary Examiner—J. Allen Shriver
(74) Attorney, Agent, or Firm—Wood, Phillips, Katz, Clark & Mortimer

(57) ABSTRACT

In a shopping cart, which is nestable into a preceding, similarly constructed cart and into which a following, similarly constructed cart is nestable, a chassis has front and rear casters including two rear, transversely spaced casters and has two generally longitudinal members, each extending along one side of the chassis, on which two camming elements are mounted. A transversely extending member is mounted to and bridges the longitudinal members. The transversely extending member is adapted to be upwardly cammed by the camming elements of a following, similarly constructed cart, which is being nested into the shopping cart, so as to elevate the rear casters of the shopping cart.

16 Claims, 1 Drawing Sheet

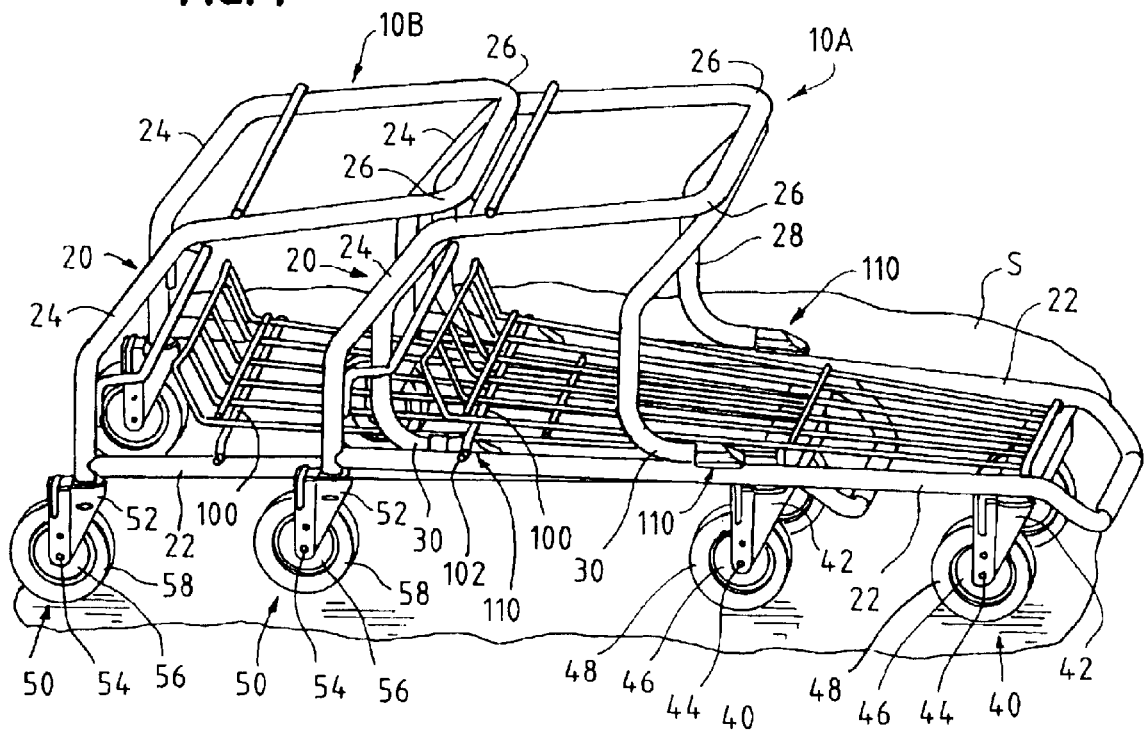
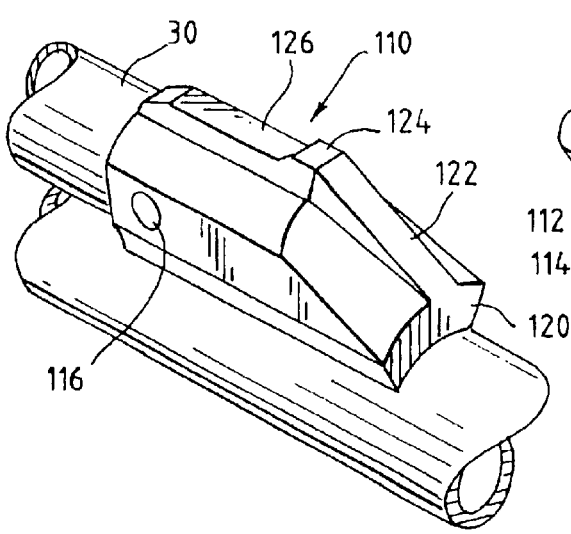
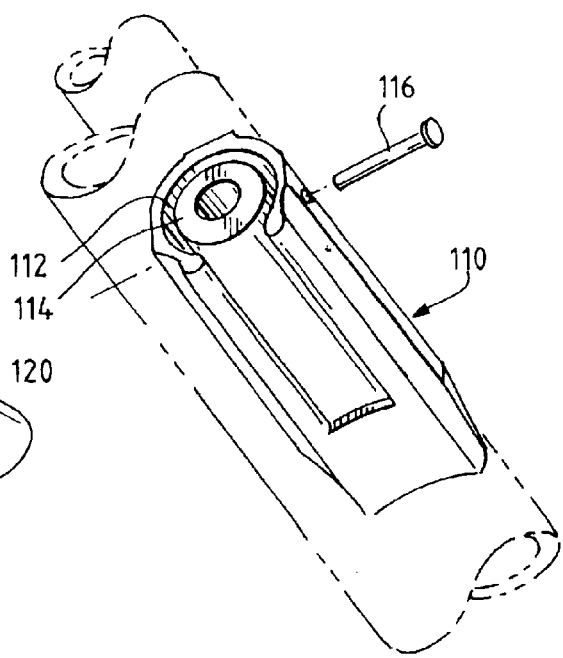

US 6,923,456 B2

SHOPPING CART HAVING CASTER LIFT

CROSS-REFERENCE TO RELATED APPLICATION

This application is a continuation-in-part of U.S. patent application Ser. No. 10/235,736, which was filed on Sep. 5, 2002 now abandon, and the disclosure of which is incorporated herein by reference.

TECHNICAL FIELD OF THE INVENTION

This invention pertains to a shopping cart, which is nestable into a preceding, similarly constructed cart and into which a following, similarly constructed cart is nestable. This invention provides the shopping cart with a rear caster-lifting capability, which reduces wear and damage to rear casters of the shopping cart.

BACKGROUND OF THE INVENTION

Conventionally, a shopping cart is designed to be nestable into a preceding, similarly constructed cart and to enable a following, similarly constructed cart to be nested into the shopping cart. Commonly, in retail stores and in parking areas near retail stores, long lines of nested shopping carts may be formed, which must be moved by store personnel.

Typically, a rear caster comprises a horn, which unlike the horn of a front caster does not swivel and which mounts an axle, and a wheel, which is journalled on the axle, via a bearing, and which has a tread. Moving of a line of nested shopping carts stresses rear casters of the nested carts, tends to cause the horns of said casters to bend, and tends to cause the bearings and treads of said casters to wear excessively, particularly as attempts are made to turn the line of nested shopping carts.

SUMMARY OF THE INVENTION

This invention provides a shopping cart, which is nestable into a preceding, similarly constructed cart and into which a following, similarly constructed cart is nestable. The shopping cart comprises a chassis, which has front and rear casters including two rear, transversely spaced casters, and which has two generally longitudinal members, each extending along one side of the chassis, between the front and back ends of the chassis. The shopping cart comprises a camming means mounted on the chassis and a transversely extending member mounted to the longitudinal members. The transversely extending member bridges the generally longitudinal members. The transversely extending member is adapted to be upwardly cammed by the camming means of a following, similarly constructed cart, which is being nested into the shopping cart, so as to elevate the rear casters of the shopping cart.

Preferably, the camming means comprises two camming elements, each being mounted on one of the longitudinally extending members. Preferably, the chassis comprises two generally upright members, each having a lower portion mounted to one of the longitudinally extending members, the camming elements being mounted between the lower portions of the generally upright members and the front end of the chassis.

Preferably, moreover, each camming member has a socket opening backwardly and the lower portion of each of the generally upright members is curved downwardly and frontwardly and is fitted snugly into the socket of a respective one of the camming elements. Preferably, moreover, each camming element has a plug, which fits snugly into the lower portion of a respective one of the generally upright members, when the lower portion of the respective one of the generally upright members is fitted snugly into the socket of said camming element.

BRIEF DESCRIPTION OF THE DRAWINGS

FIG. 1 is a fragmentary, perspective view of a chassis, front and rear casters, and other lower structures of a shopping cart and of a chassis, front and rear casters, and other lower structures of a similar cart being nested into the shopping cart.

FIG. 2 is an enlarged, perspective detail illustrating one of two camming elements, as mounted on fragmentarily illustrated members of the chassis of the shopping cart via set screws.

FIG. 3 is a similarly enlarged, partly exploded, perspective detail thereof, as seen from a different vantage. In FIG. 3, the chassis members are illustrated in broken lines, again fragmentarily.

DETAILED DESCRIPTION OF THE ILLUSTRATED EMBODIMENT

As illustrated in FIG. 1, two shopping carts are similar, except as disclosed herein, to the shopping cart disclosed in U.S. Pat. No. 5,791,666, the disclosure of which is incorporated herein by reference. It is convenient to refer to the right-hand cart as a preceding cart 10A and to refer to the left-hand cart as a following cart 10B. The shopping carts 10A, 10B, are illustrated as standing on an underlying surface S, such as a floor.

Each shopping cart 10A, 10B, comprises a chassis 20 having two longitudinally extending, tubular steel members 22, one along each side of the chassis 20, having two rear, tubular steel, generally upright members 24, which are welded to the longitudinally extending members 22 and which extend frontwardly at the upper ends 26 of the rear uprights 24, and having two intermediate, tubular steel, generally upright members 28, which are welded to the longitudinally extending members 22, at curved lower portions 30 of the intermediate uprights 28, and to the rear uprights 24, at the upper ends 28 of the rear uprights 24. The lower portions 30 of the intermediate members 28 are curved downwardly and frontwardly where welded to the longitudinally extending members 22. As illustrated and described in U.S. Pat. No. 5,791,666, supra, the shopping cart 10 has a handle structure, a wire or polymeric basket, and other features, details of which are outside the scope of this invention.

The chassis 20 has two front, transversely spaced casters 40, which are mounted to the chassis 20, and two rear, transversely spaced casters 50, which are mounted to the chassis 20. Each front caster 40 comprises a horn 42, which is adapted to swivel about a vertical axis, an axle 44, which is mounted operatively to the horn 42, and a wheel 46, which is journalled on the axle 44, via a bearing, and which has a tread 48. Each rear caster 50 comprises a horn 52, which is not adapted to swivel, an axle 54, which is mounted operatively to the horn 52, and a wheel 56, which is journalled on the axle 54, via a bearing, and which has a tread 58. The bearings of the casters 40, 50, are concealed in the drawings.

The chassis 20 has a transversely extending bar 100, which is welded at its opposite ends 102 to longitudinally extending members 22 so as to extend across the chassis 20 and so as to bridge the longitudinally extending members 22. The chassis 20 has two similarly shaped, transversely spaced, camming elements 110, which are molded from a suitable engineering polymer, such as nylon 6, and which are mounted on the lower portions 30 of the intermediate uprights 28, so as to be disposed on the longitudinally extending members 22 and so as to be frontward of the transversely extending bar 100, about midway between the front casters 40 and the rear casters 50.

Each camming element 110 has a socket 112, into which the lower portion 30 of a respective one of the intermediate uprights 28 fits snugly, and a plug 114, which fits snugly into the lower portion 30 of a respective one of the generally upright members, when the lower portion of the respective one of the intermediate uprights 28 is fitted snugly into the socket 112 of said camming element. Each camming element 110 is secured to the lower portion 30 of the respective one of the intermediate uprights 28, via a rivet 116, as illustrated.

Each camming element 110 a front, nose portion 120, which has a camming surface 122 facing upwardly and frontwardly, an upper, hump portion 124, which is disposed behind the camming surface 122, and an upper, flat portion 126, which is disposed behind the upper, hump portion 118.

As illustrated in FIG. 1, the camming surfaces 122 of the camming elements 110 of the following cart 10B are adapted to cam the transversely extending bar 100 of the preceding cart 10A, into which the following cart 10 is being nested, upwardly so as to elevate the rear casters 50 of the preceding cart 10A above the underlying surface S. Moreover, the transversely extending bar 100 of the preceding cart 10 is adapted to be cammed upwardly by camming surfaces 122 of the camming elements 110 of the following cart 10B, which is being nested into the preceding cart 10A, so as to elevate the rear casters 50 of the preceding cart 10A. Furthermore, the upper flat portions 126 of the camming elements 110 of the following cart 10B define an upper, generally horizontal platform, on which the transversely extending bar 100 of the preceding cart 10A can be seated after having been cammed upwardly.

The shopping carts 10A, 10B, exemplify any two nested carts in a long line of nested shopping carts. Because the rear casters of the nested carts are elevated above the underlying surface, except for the rear casters of the final cart in the line, moving of the line of nested shopping carts does not stress the elevated casters, does not tend to cause the horns of the elevated casters to bend, and does not tend to cause the bearings or treads of the elevated casters to wear excessively, particularly as attempts are made to turn the line of nested shopping carts. Because all casters touching the underlying surface can swivel, except for the rear casters of the final cart in the line, the line can be turned easily.

What is claimed is:

1. A shopping cart, which is nestable into a preceding, similarly constructed cart and into which a following, similarly constructed cart is nestable, comprising:
    a chassis, which a front end and a back end, which has front and rear casters, including two rear, transversely spaced casters, and which has two generally longitudinal members, each extending along one side of the chassis, between the front and back ends of the chassis;
    camming members mounted on the chassis and a transversely extending member bridging the generally longitudinal members; and
    an upright frame member including upright legs with lower tubular ends, said lower tubular ends being secured to the generally longitudinal members in a substantially parallel orientation thereto at a position intermediate the chassis front and back ends with said lower tubular ends extending toward said chassis front end from said upright legs;
    wherein said camming members are mounted to the front ends of the lower tubular ends, and
        adapted to upwardly cam the transversely extending member of a preceding, similarly constructed cart into which the shopping cart is being nested, so as to elevate the rear casters of the preceding shopping cart, and
    wherein each of said camming members has a socket in which one of the frame member lower tubular ends is received.

2. The shopping cart of claim 1, wherein each of said camming members has a plug snugly fit in one of said frame member lower tubular ends.

3. The shopping cart of claim 2, wherein said plug defines a semi-cylindrical chamber in said socket, and said one of said frame member tubular ends defines a generally cylindrical wall snugly fit in said chamber.

4. The shopping cart of claim 1, wherein, for each camming member, said socket has a front end defining a limit to movement of the camming member toward the back end.

5. The shopping cart of claim 4, further comprising a locking pins extending transversely through each camming member and lower tubular end received therein.

6. The shopping cart of claim 5, wherein said locking pin is a rivet.

7. The shopping cart of claim 1, wherein said camming members are molded polymer.

8. The shopping cart of claim 7, wherein said polymer is nylon.

9. A shopping cart, which is nestable into a preceding, similarly constructed cart and into which a following, similarly constructed cart is nestable, comprising:
    a chassis including two generally longitudinal members each extending along one side of the chassis between front and back ends of the chassis;
    front and rear casters secured to said chassis, said rear casters including two rear, transversely spaced casters;
    a transversely extending member bridging the generally longitudinal members;
    an upright frame member including upright legs with lower tubular ends, said lower tubular ends being secured to the generally longitudinal members in a substantially parallel orientation thereto, said frame member being intermediate the chassis front and back ends with said lower tubular ends extending toward said chassis front end from said upright legs; and
    cam members mounted to the front ends of the lower tubular ends, said cam members being adapted upwardly cam the transversely extending member of a preceding, similarly constructed cart into which the shopping cart is being nested, so as in elevate the rear caster of the preceding shopping cart,
    wherein each of said cam members has a socket in which one of the frame member lower tubular ends is received.

10. The shopping cart of claim 9, wherein each of said cam members has a plug snugly fit in one of said frame member lower tubular ends.

11. The shopping cart of claim 10, wherein said plug defines a semi-cylindrical chamber in said socket, and said one of said frame member tubular ends defines a generally cylindrical wall snugly fit in said chamber.

12. The shopping cart of claim 9, wherein, for each cam member, said socket has a front end defining a limit to movement of the cam member toward the back end.

13. The shopping cart of claim 12, further comprising a locking pin extending transversely through both each cain members and lower tubular end received therein.

14. The shopping cart of claim 13, wherein said locking pin is a rivet.

15. The shopping cart of claim 9, wherein said cam members are molded polymer.

16. The shopping cart of claim 15, wherein said polymer is nylon.

* * * * *

UNITED STATES PATENT AND TRADEMARK OFFICE
CERTIFICATE OF CORRECTION

PATENT NO. : 6,923,456 B2
DATED : August 2, 2005
INVENTOR(S) : Mark T. Ryan et al.

It is certified that error appears in the above-identified patent and that said Letters Patent is hereby corrected as shown below:

Column 5,
Line 5, "both" should be deleted.

Signed and Sealed this

Twentieth Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,923,456 B2  Page 1 of 1
APPLICATION NO. : 10/656711
DATED : August 2, 2005
INVENTOR(S) : Mark T. Ryan et al.

It is certified that error appears in the above-identified patent and that said Letters Patent is hereby corrected as shown below:

Col. 3, line 55, after "a chassis, which" and before "a front end", --has-- is inserted.

Signed and Sealed this

Eleventh Day of July, 2006

JON W. DUDAS
*Director of the United States Patent and Trademark Office*